United States Patent [19]
Hashimoto

[11] Patent Number: 5,662,285
[45] Date of Patent: Sep. 2, 1997

[54] SPINNING REEL FOR FISHING WITH A SLIDER FOR LONGITUDINALLY MOVING A SPOOL

[75] Inventor: Hiroshi Hashimoto, Tokyo, Japan

[73] Assignee: Daiwa Seiko, Inc., Tokyo, Japan

[21] Appl. No.: 425,111

[22] Filed: Apr. 20, 1995

[30] Foreign Application Priority Data

Apr. 20, 1994 [JP] Japan ................. 6-005441 U

[51] Int. Cl.⁶ ............................................. A01K 89/01
[52] U.S. Cl. ...................... 242/241; 242/279; 242/158.3
[58] Field of Search ........................... 242/241, 242, 242/279, 158.3

[56] References Cited

U.S. PATENT DOCUMENTS

| | | | |
|---|---|---|---|
| 4,892,267 | 1/1990 | Webb | 242/241 X |
| 5,232,181 | 8/1993 | Fujine | 242/279 X |
| 5,273,234 | 12/1993 | Hitomi | 242/241 |
| 5,415,358 | 5/1995 | Yamaguchi | 242/279 X |

FOREIGN PATENT DOCUMENTS

| | | | |
|---|---|---|---|
| 141768 | 9/1982 | Japan | 242/279 |
| 61-6766 | 2/1986 | Japan . | |
| 4-38266 | 3/1992 | Japan . | |

*Primary Examiner*—Daniel P. Stodola
*Assistant Examiner*—Emmanuel M. Marcelo
*Attorney, Agent, or Firm*—Longacre & White

[57] ABSTRACT

A spinning reel for fishing so designed as to offer light and smooth winding performance and to restrain the rotational clattering of a slider fixed to a spool shaft. A slider of a slide mechanism for a spool shaft is slidably fitted over a rotary shaft so that a mating part of the slider is engaged with a traverse cam groove of the rotary shaft. The slider is also fitted through its fitting hole over a guide rod extending parallel to the rotary shaft. The section of the fitting hole is formed into such a non-circular configuration as to suppress the generation of rotational clattering of the slider about the spool shaft and to provide a releasing portion in an offset direction in which the rotary shaft is offset with respect to the spool shaft.

6 Claims, 4 Drawing Sheets

SPINNING REEL FOR FISHING WITH A SLIDER FOR LONGITUDINALLY MOVING A SPOOL

BACKGROUND OF THE INVENTION

The present invention relates to a spinning reel for fishing which is provided with a sliding unit for longitudinally moving a spool.

Spinning reels for fishing that have heretofore been proposed are designed so that a spool shaft having, at its leading end, a spool on which a fishing line is to be wound is fitted to a slider which is longitudinally moved as a result of the conversion of rotary motion of a handle by means of an oscillating mechanism. "Spinning Reel for Fishing" disclosed by Japanese Utility Model No. 6766/1985, "Spinning Reel" by Japanese Utility Model Laid-Open No. 38266/1992 and so forth are known as the prior art to which the present invention is directed.

FIG. 8 is a vertical sectional side view of a conventional spinning reel for fishing.

There is shown a slider 82 of a sliding mechanism to which a spool shaft 80 having a spool at its leading end is securely fitted, and which is fitted over a rotary shaft 81 provided with a traverse cam groove. In order to restrain a rotational clattering about the spool shaft 80 to suppress a rotational noise when a handle 83 is turned while stabilizing the operation of the reel, a mating groove provided at the lower end of the slider 82 is slidably fitted over a guide rail 85 formed on the underside of a casing 86.

FIG. 9 is a vertical sectional view of a transmission member in a conventional spinning reel. FIG. 10 is a side view of an arrangement of a guide member in the conventional spinning reel of FIG. 9.

The spinning reel shown in FIGS. 9, 10 has a transmission member (or a slider) 92 to which a spool shaft 90 is fixed, and which is fitted over a threaded shaft (or a rotary shaft) 91 formed with a traverse cam groove. In order to restrain a rotational clattering about the spool shaft 90 to suppress a rotational noise when a handle is turned while stabilizing the operation of the reel, the slider 92 is longitudinally and slidably fitted over a guide rod 94 longitudinally placed across a reel body 93 (or a casing).

In the conventional spinning reels for fishing, however, if the parallelism between the spool shaft 80, 90 and the shaft (such as the rotary shafts 81, 91, the guiding lever 94) on which the slider 82, 92 is guided remains unsatisfactory due to dimensional variation or inaccuracy in molding and machining of the reel body 93, the casing 86 and various components, the longitudinal movement of the slider 82, 92 become heavy, which hinders the smooth operation of the handle.

Although the inadequate longitudinal movement of the slider 82, 92 is made relievable by enlarging the mating hole in each mating part to provide a play therebetween which can absorb the unsatisfactory parallelism, such a play may conversely cause the rotational clattering of the slider 82, 92 about the spool shaft 80, 90 due to the clattering of each part of the relevant member, which results in the rotational noise generating when the handle is turned. Problems arising from the clattering include lowering the rotational performance of the handle, making unstable the engagement of the traverse cam groove of the rotary shaft 81, 91 with the slider 82, 92, badly affecting the durability of the reel and the like.

SUMMARY OF THE INVENTION

An object of the present invention is to provide a spinning reel for fishing so designed that clattering of a spool is restrained as much as possible to thereby lower the generation of the rotational noise and ensure the light and smooth winding performance.

In order to attain the above-noted and other objects, the present invention provides a spinning reel for fishing, which includes: a casing; a spool shaft movably supported by said casing; a rotary shaft provided with a traverse cam groove and supported in parallel to said spool shaft by said casing; gear means for rotating said rotary shaft by turning a handle; a guide tube fitted over said rotary shaft; and a slider fixed to said spool shaft and slidably fitted over said guide tube through a fitting hole, said slider having a mating part engaged with said traverse cam groove. The section of said fitting hole is formed into such a non-circular configuration as to suppress the generation of rotational clattering of said slider about said spool shaft and to provide a releasing portion in an offset direction in which said guide tube is offset with respect to the spool shaft.

Preferably, said section of said fitting hole of said slider is substantially oval, so that said oval fitting hole defines a large clearance from said guide tube in said offset direction to provide said releasing portion, and a small clearance from said guide tube in a direction perpendicular to said offset direction to provide a short portion for suppressing the generation of rotational clattering of said slider.

The section of said fitting hole may be formed such that an upper section of said fitting hole near to said spool shaft in said offset direction is substantially oval to define said releasing portion and a lower section of said fitting hole far from said spool shaft in said offset direction is left opened.

The present invention further provides a spinning reel for fishing, which includes: a casing; a spool shaft movably supported by said casing; a rotary shaft provided with a traverse cam groove and supported in parallel to said spool shaft by said casing; gear means for rotating said rotary shaft by turning a handle; a slider fixed to said spool shaft and slidably fitted over said rotary shaft so that a mating part of said slider is engaged with said traverse cam groove, said slider having a fitting hole; and a guide rod extending parallel to said rotary shaft, said slider being slidably fitted over said guide rod through said fitting hole. The section of said fitting hole is formed into such a non-circular configuration as to suppress the generation of rotational clattering of said slider about said spool shaft and to provide a releasing portion in an offset direction in which said rotary shaft is offset with respect to the spool shaft.

Preferably, the section of said fitting hole of said slider is substantially oval, so that said oval fitting hole defines a large clearance from said rotary shaft in said offset direction to provide said releasing portion, and a small clearance from said rotary shaft in a direction perpendicular to said offset direction to provide a short portion for suppressing the generation of rotational clattering of said slider.

The section of said fitting hole may be formed such that an upper section of said fitting hole near to said spool shaft in said offset direction is substantially oval to define said releasing portion and a lower section of said fitting hole far from said spool shaft in said offset direction is left opened.

DETAILED DESCRIPTION OF THE PREFERRED EMBODIMENTS

Referring to the accompanying drawings, the present invention will be described.

Figure 1:
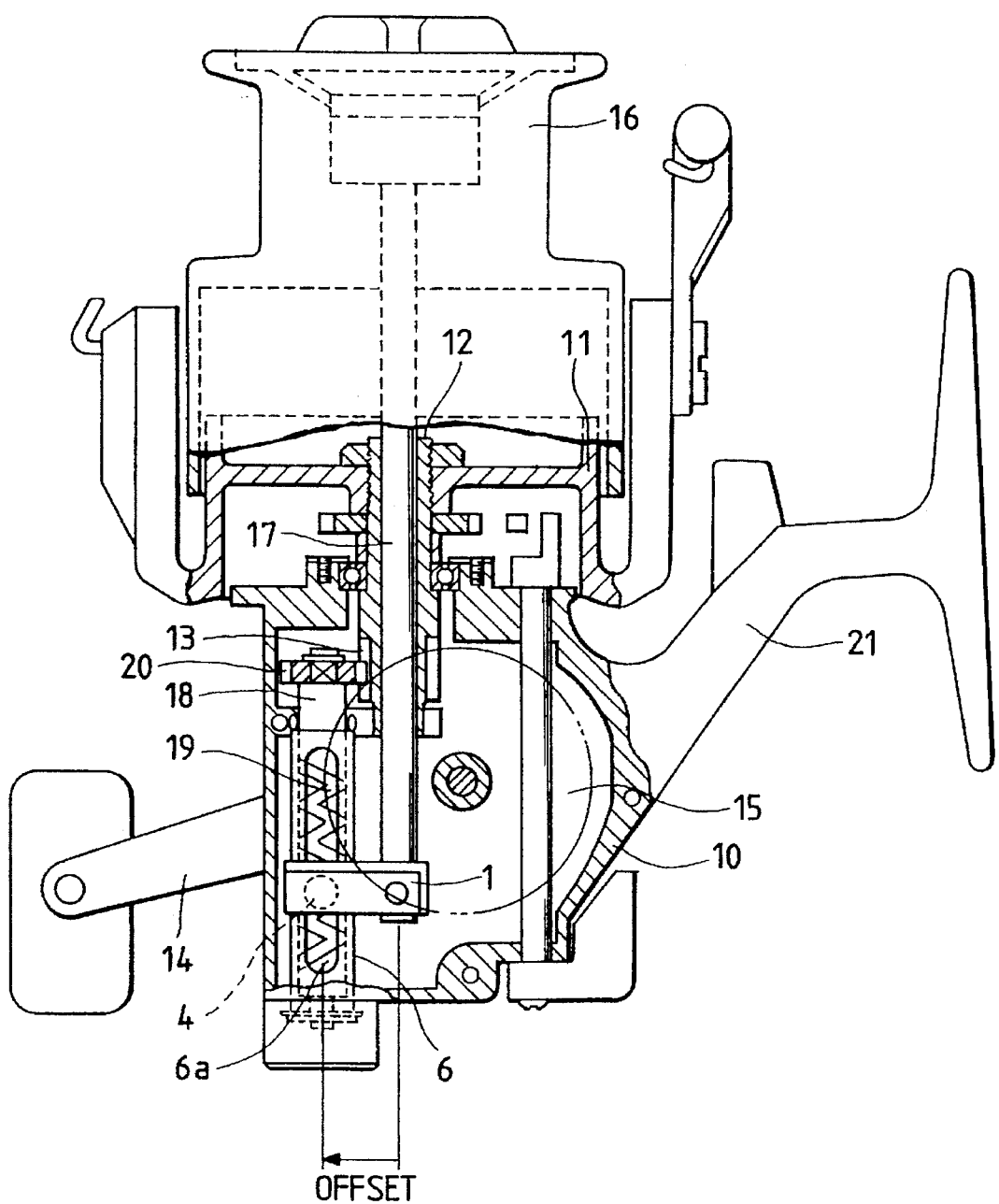
FIG. 1 is a partial cutaway elevational view of a spinning reel for fishing according to a first embodiment of the invention.
Figure 2:
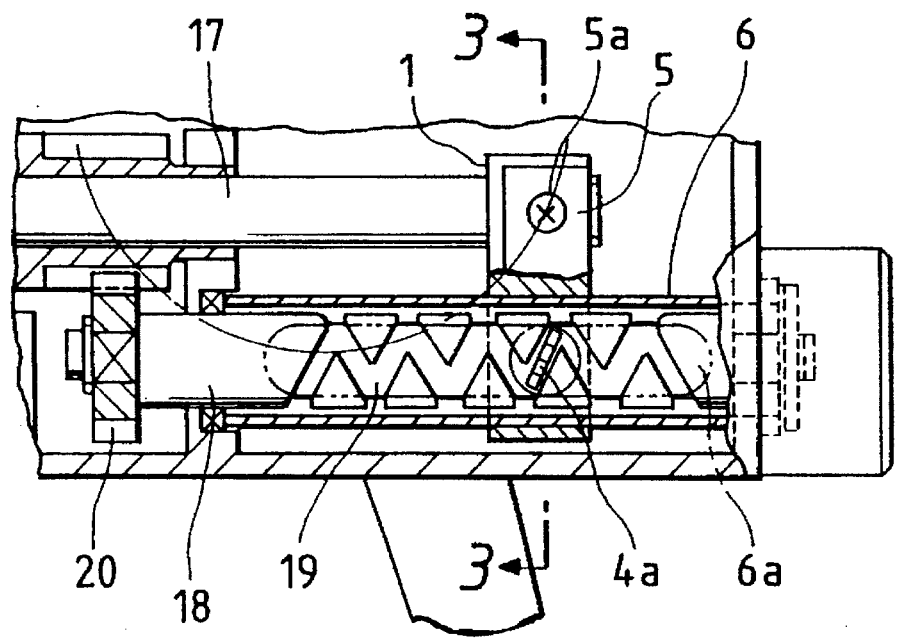
FIG. 2 is an enlarged view of the principal part of the spinning reel for fishing shown in FIG. 1.
Figure 3:
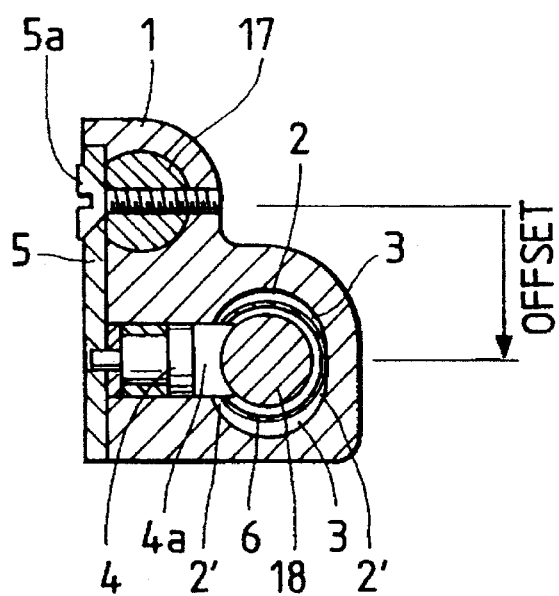
FIG. 3 is a sectional view taken along line 3—3 of FIG. 2.

FIGS. 1–3 illustrate a spinning reel for fishing in a first embodiment of the invention.

As shown in FIG. 1, a rotor 11 is secured to the leading end of a cylindrical shaft 12 and the cylindrical shaft 12 is rotatably supported in the front part of a casing 10. A pinion 13 which is integral with the base of cylindrical shaft 12 meshes with a driving gear 15 interlocking with a handle 14. A spool shaft 17 having a spool 16 at the leading end of the shaft is fitted into the cylindrical shaft 12, and a rotary shaft 18 having a traverse cam groove 19 is supported with a bearing in parallel to the spool shaft 17 in the lower part of the casing 10. A gear 20 meshing with the pinion 13 is secured to the leading end of the rotary shaft 18. A cylindrical guide tube 6 having a slot 6a facing the traverse cam groove 19 is set on the outer periphery of the rotary shaft 18 and used as a substitute for a guide rail mechanism to stabilize the sliding operation.

The slider 1 of a sliding mechanism for converting the torque transmitted from the handle 14 via the driving gear 15 and the pinion 13 into the horizontal movement of the spool shaft 17 is, as shown in FIGS. 2, 3, secured to the end of the spool shaft 17 by turning a screw 5a into the shaft via a mounting plate 5. Simultaneously, the guide tube 6 on the outer periphery of the rotary shaft 18 is fitted into a substantially oval mating hole 2 having a short portion 2' and a releasing portion 3 provided in the offset direction of the guide tube 6 with respect to the spool shaft 17. As a result, the pawl 4a of a mating part 4 in the slider 1 mates with the traverse cam groove 19 on the rotary shaft 18 through the slot 6a of the guide tube 6, whereby the slider 1 is allowed to Slide freely on the guide tube 6.

Now when the handle 14 is turned, the rotor 11 is turned via the driving gear 15 and the pinion 13. Simultaneously, the pinion 13 causes the rotary shaft 18 to turn via the gear 20, and the part 4 mating with the traverse cam groove 19 also causes the slider 1 to move longitudinally, to thereby reciprocate the spool shaft 17 longitudinally.

In this case, if the parallelism between the spool shaft 17 and each of the rotary shaft 18 and guide tube 6 on which the slider 1 is guided remains unsatisfactory due to dimensional inaccuracy caused in molding and machining the casing 10 and various components, a conventional structure suffers from the problem that the longitudinal movement of the slider 1 becomes heavy, and the smooth operation of the handle 14 is hindered thereby. However, in the present invention, since the releasing portion 3 is formed in the offset direction of the guide tube 6 with respect to the spool shaft 17 (i.e. the up-and-down direction with the leg portion 21 of the spinning reel as its upper part) so as to provide the substantially oval sectional configuration of the mating hole 2 of the slider 1 into which the guide tube 6 is fitted, the mating hole 2 provides a clearance which can absorb the inaccuracy caused during the longitudinal operation of the slider 1 due to the unsatisfactory parallelism in the offset direction while restricting the rotational clattering about the spool shaft 17 as much as possible by means of the short portion 2' thereof.

As noted above, the present embodiment employs the following arrangements: The guide tube 6 is provided for the rotary shaft 18 to stabilize the aforementioned sliding operation and to restrain the clattering of the spool causing a rotational noise as much as possible. Further, the sectional configuration of the mating hole 2 of the slider 1 is made substantially oval with the longer side directed in the offset direction of the guide tube 6 with respect to the spool shaft 17, to thereby permit a dimensional error resulting in unsatisfactory parallelism in a direction irrelevant to the rotational clattering of the slider 1 about the spool shaft 17 with the releasing portion 3 formed in the mating hole 2 as well as to restrict the rotational clattering of the slider 1 with the short portion 2' of the mating hole 2. Thus, it is possible to eliminate the rotational noise, ensure the light and smooth winding performance, and provide the improved durability of the sliding mechanism.

Figure 4:
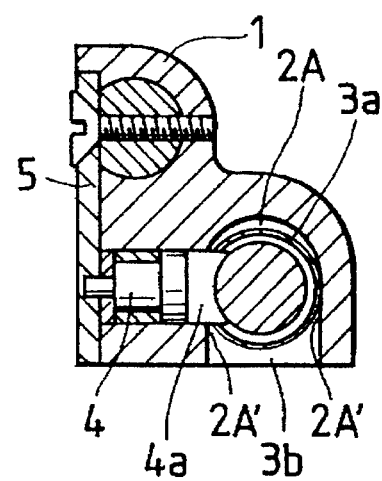
FIG. 4 is a sectional view of another slider of a spinning reel for fishing according to a second embodiment of the invention.

FIG. 4 is a sectional view of another slider of a spinning reel for fishing according to a second embodiment of the invention.

In the aforementioned first embodiment, the slider 1 for receiving the guide tube 6 is formed with the mating hole 2 the sectional configuration of which is made entirely oval with the longer side oriented in the offset direction of the guide tube 6 with respect to the spool shaft 17. Instead, in this second embodiment shown in FIG. 4, the sectional configuration of a mating hole 2A is such that the upper releasing section 3a thereof is formed as a substantially oval contour, whereas the lower section 3b is left open as shown therein. Reference numeral 2A' designates a short portion 2A' of the mating hole 2A, which, as similarly to the first embodiment, serves to suppress the clattering of the slider 1 in the rotational direction. Like the preceding and following embodiments of the invention, like reference numerals designate like or corresponding components and the description of them will, therefore, be omitted.

In the case of the second embodiment of the invention, by making the mating hole opened downward, a greater clearance is provided to permit a dimensional error causing unsatisfactory parallelism without sacrificing the light and smooth winding performance, and to make it easy to fit the slider 1 onto the rotary shaft 18 with the guide tube 6 provided thereon.

Figure 5:
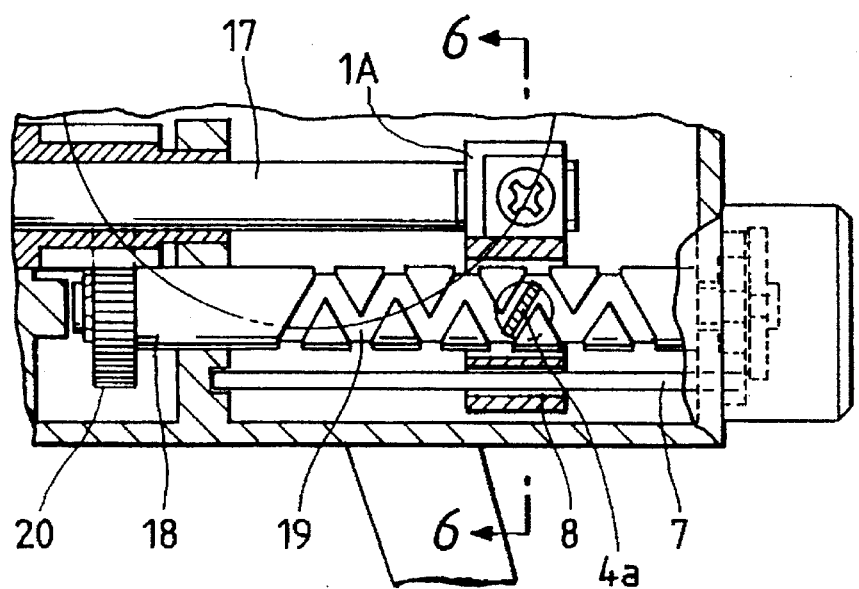
FIG. 5 is a partial cutaway elevational view of another sliding mechanism of a spinning reel for fishing according to a third embodiment of the invention.
Figure 6:
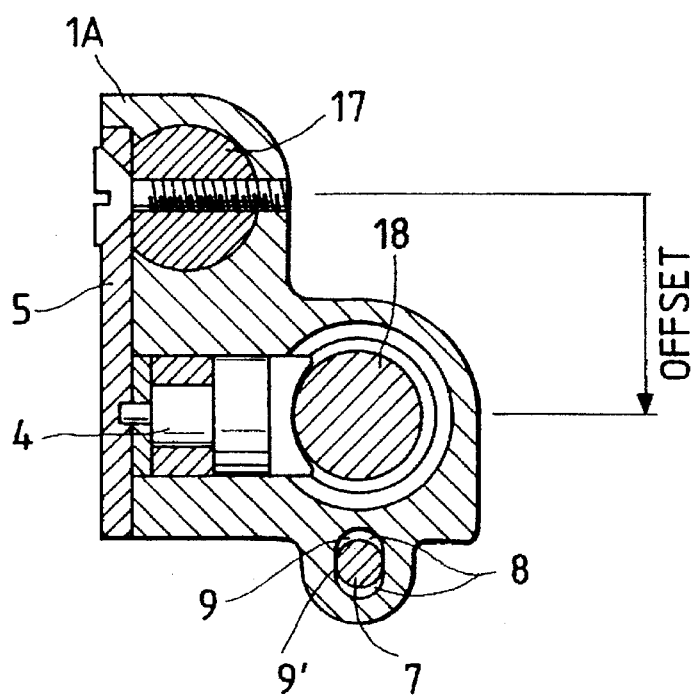
FIG. 6 is a sectional view taken along line 6—6 of FIG. 5.

FIG. 5 is a partial cutaway elevational view of another sliding mechanism of a spinning reel for fishing according to a third embodiment of the invention. FIG. 6 is a sectional view taken on line 6—6 of FIG. 5.

Instead of the guide tube 6 provided on the rotary shaft 18 in the first and second embodiments, the spinning reel of the third embodiment shown in FIG. 5 employs a guide rod 7 for stabilizing the operation of the sliding mechanism and facilitating the prevention of the rotational clattering of a slider 1A.

As shown in FIGS. 5 and 6, the bridge 1A is secured to the spool shaft 17, and the rotary shaft 18 formed with the traverse cam groove 19 is slidably fitted into the slider 1A. The slider 1A is longitudinally movably fitted on the guide rod 7, which is longitudinally placed across the casing under the rotary shaft 18, through a substantially oval mating hole 9, the mating hole 9 being formed with a releasing portion 8 in the offset direction of the guide rod 7 with respect to the spool shaft 17.

In this case, like reference characters designate like or corresponding parts and the description of them will be omitted.

When the handle is turned, the rotary shaft 18 is also turned via the gear 20. While being guided by the guide rod 7, the slider 1A is caused to slide by the part 4 mating with the traverse cam groove 19. The attempt rotational clattering of the slider 1A about the spool shaft 17 is prohibited by a short portion 9' of the substantially oval mating hole 9 as much as possible as in the case of the first embodiment.

Since the guide rod 7 is located opposite and in parallel with respect to the rotary shaft 18 and the spool shaft 17, and further the sectional configuration of the mating hole 9 of the slider 1A is formed as the substantially oval configuration to suppress the rotational clattering of the slider 1A in the third practice of the invention, it is possible to stabilize the sliding operation of the slider while ensuring the light and smooth winding performance with the reduction of the influence of the clattering.

Moreover, the use of such a tubular guide rod 7 in place of the guide tube 6 contributes to reducing not only the parts-manufacturing cost but also sliding resistance in comparison with the case of the guide tube 6, whereby the longitudinal movement of the spool shaft can be made more smoothly.

Figure 7:
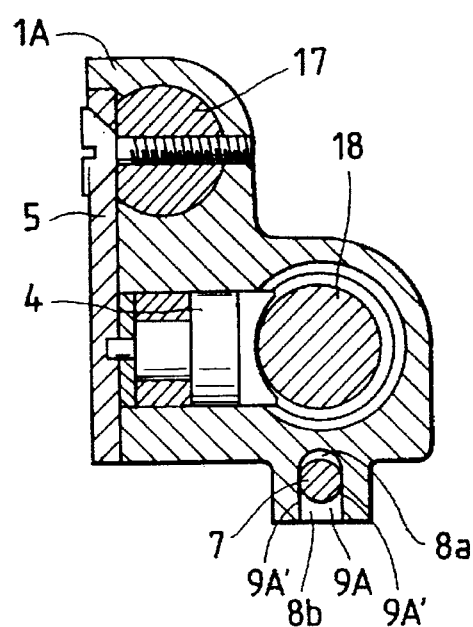
FIG. 7 is a sectional view of still another slider of a spinning reel for fishing according to a fourth embodiment of the invention.
Figure 9:
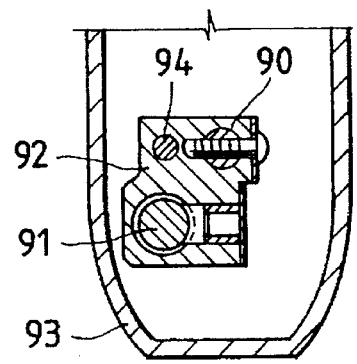
FIG. 9 is a vertical sectional view of a transmission member in a conventional spinning reel.
Figure 8:
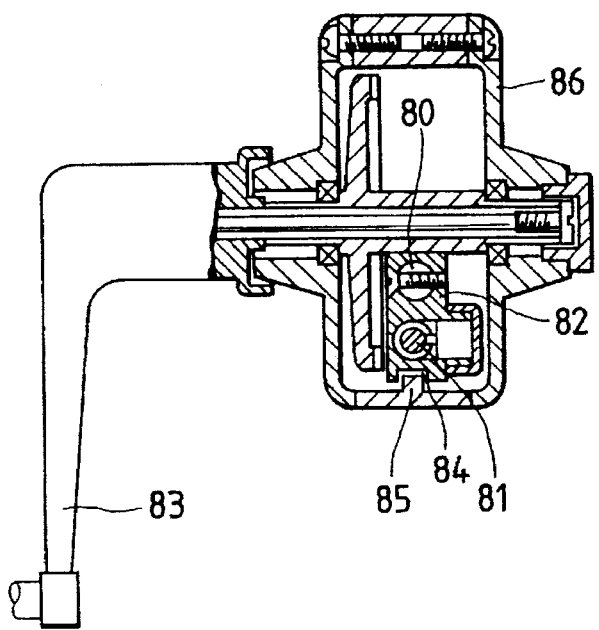
FIG. 8 is a vertical sectional side view of a conventional spinning reel for fishing.
Figure 10:
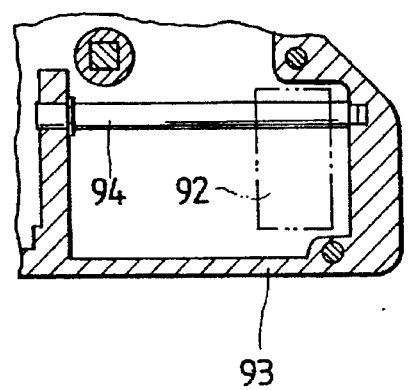
FIG. 10 is a side view of an arrangement of a guide member in the conventional spinning reel shown in FIG. 9.

FIG. 7 is a sectional view of still another slider of a spinning reel for fishing according to a fourth embodiment of the invention.

In contrast to the arrangement of the entirely oval mating hole 9 into which the guide rod 7 is fitted in the third embodiment, in the forth embodiment there is formed a mating hole 9A with its upper releasing section 8a set substantially oval and its lower section 8b left open as shown in FIG. 7. Incidentally, a short portion 9A' of the mating hole 9A serves to suppress a rotational clattering of a slider 1A. In addition to those newly introduced herein, like reference characters designate like or corresponding parts and the description of them will be omitted.

In the case of the fourth embodiment of the invention wherein the sectional configuration of the mating hole 9A is formed in the above-noted manner, the advantage is that while the rotational clattering of slider 1A can be restrained, the guide rod 7 is readily fitted into the slider 1A.

As set forth above, according to the present invention, since the sectional configuration of the fitting hole of the slider, through which the slider is slidably fitted over the guide tube, is made non-circular to provide the releasing portion in the offset direction of the guide tube with respect to the spool shaft, it is possible to restrain the generation of the rotational noise effectively while maintaining the light and smooth winding performance of the reel.

In case the sectional configuration of the fitting hole of the slider is made substantially oval, the generation of rotational clattering of the bridge can be restrained as much as possible while the strength of the mating part of the slider is maintained. The handle can thus be turned smoothly.

In case the sectional configuration of the fitting hole of the slider fitted over the guide tube is such that the upper section on the spool shaft side is substantially oval whereas the lower section of the hole is left open, it is possible to restrain the generation of rotational clattering of the slider as much as possible and to ease the assembling work for the slider.

Further, according to the present invention, since the sectional configuration of the fitting hole of the slider, through which the slider is longitudinally, movably fitted over the guide lever, is made non-circular to provide the releasing portion in the offset direction of the guide rod with respect to the spool shaft, it is possible to restrain the generation of rotational clattering of the slider while maintaining the light and smooth winding performance of the reel.

In case the sectional configuration of the fitting hole of the slider, through which the slider is fitted over the guide rod is made substantially oval, it is possible to restrain the generation of rotational clattering of the slider as much as possible while maintaining the strength of the mating part of the slider.

In case the sectional configuration of the fitting hole of the slider, thorough which the slider is fitted over the guide rod, is formed such that the upper section of the fitting hole on the spool shaft side is substantially oval, whereas the lower section thereof is left open, it is reduce the generation of rotational clattering of the slider as much as possible and to ease assembling work for the slider.

What is claimed is:

1. A spinning reel for fishing comprising:
   a casing;
   a spool shaft movably supported by said casing;
   a rotary shaft provided with a traverse cam groove and supported in parallel to said spool shaft by said casing;
   gear means for rotating said rotary shaft by turning a handle;
   a guide tube fitted over said rotary shaft; and
   a slider fixed to said spool shaft and slidably fitted over said guide tube through a fitting hole, said slider having a mating part engaged with said traverse cam groove, wherein
   a section of said fitting hole is formed into an elliptical configuration as to suppress the generation of rotational clattering of said slider about said spool shaft and to provide a releasing portion in an offset direction in which said guide tube is offset with respect to the spool shaft.

2. A spinning reel for fishing comprising:
   a casing;
   a spool shaft movably supported by said casing;
   a rotary shaft provided with a traverse cam groove disposed parallel to said spool shaft supported by said casing;
   gear means for rotating said rotary shaft by turning a handle:
      a guide tube disposed about said rotary shaft; and
      a slider fixed to said spool shaft and slidably fitted over said guide tube through a fitting hole, said slider having a mating part engaged with said transverse cam groove, wherein
      a section of said fitting hole is formed into such a non-circular configuration as to suppress the generation of rotational clattering of said slider about said spool shaft and to provide a releasing portion in an offset direction in which said guide tube is offset with respect to said spool shaft, said section of said fitting hole of said slider is substantially oval, said oval fitting hole defining a first clearance from said guide tube in said offset direction to provide said releasing portion, and a second clearance from said guide tube in a direction perpendicular to both said offset direction and an axis of said rotary shaft to provide a short portion for suppressing the generation of rotational clattering of said slider, said first clearance being larger than said second clearance.

3. A spinning reel for fishing comprising:

a casing;

a spool shaft movably supported by said casing;

a rotary shaft provided with a traverse cam groove disposed parallel to said spool shaft supported by said casing;

gear means for rotating said rotary shaft by turning a handle:

a guide tube disposed about said rotary shaft; and a slider fixed to said spool shaft and slidably fitted over said guide tube through a fitting hole, said slider having a mating part engaged with said transverse cam groove, wherein a section of said fitting hole is formed into such a non-circular configuration as to suppress the generation of rotational clattering of said slider about said spool shaft and to provide a releasing portion in an offset direction in which said guide tube is offset with respect to said spool shaft, the section of said fitting hole near to said spool shaft in said offset direction is substantially oval to define said releasing portion and a lower section of said fitting hole far from said spool shaft in said offset direction is left open.

4. A spinning reel for fishing as claimed in claim 1, wherein said guide tube has an elongated guide hole for guiding said mating part therealong so that said slider reciprocates longitudinally in linking with rotation of said rotary shaft.

5. A fishing reel for spinning comprising:

a casing;

a spool shaft movably supported by said casing;

a rotary shaft provided with a traverse cam groove disposed parallel to said spool shaft supported by said casing;

gear means for rotating said rotary shaft by turning a handle:

a guide tube disposed about said rotary shaft;

a slider fixed to said spool shaft and slidably fitted over said guide tube through a fitting hole, said slider being formed integrally to define a unitary body;

a mating part disposed within said slider engaging said traverse cam groove such that upon rotation of said rotary shaft said slider and said spool shaft reciprocates longitudinally; wherein, a section of said fitting hole is formed into a substantially elliptical configuration to suppress the generation of rotational clattering of said slider about said spool shaft.

6. A spinning reel for fishing as claimed in claim 5, wherein a distance between said guide tube and said fitting hole defines:

a first pair of clearances diametrically disposed along a major axis of said elliptically configured fitting hole, said first pair of clearances providing a means to tolerate inaccuracies caused during the longitudinal reciprocation of said slider;

a second pair of clearances diametrically disposed along a minor axis of said elliptically configured fitting hole, said second pair of clearances providing a means to restrict said rotational clattering.

* * * * *